(12) United States Patent
Klems et al.

(10) Patent No.: US 7,937,666 B2
(45) Date of Patent: May 3, 2011

(54) FORM-FIELD MASK FOR SENSITIVE DATA

(75) Inventors: Ryan R. Klems, Oro Valley, AZ (US); Yousuf Ajmerwala, San Jose, CA (US); Ronald A. La Motte, Mountain View, CA (US); Piyush Patel, San Jose, CA (US)

(73) Assignee: Apple Inc., Cupertino, CA (US)

( * ) Notice: Subject to any disclaimer, the term of this patent is extended or adjusted under 35 U.S.C. 154(b) by 745 days.

(21) Appl. No.: 11/825,042

(22) Filed: Jul. 3, 2007

(65) Prior Publication Data

US 2009/0013279 A1      Jan. 8, 2009

(51) Int. Cl.
*G06F 13/00* (2006.01)
*G06F 15/00* (2006.01)

(52) U.S. Cl. .................................. 715/780; 715/777

(58) Field of Classification Search .......... 715/777–780, 715/763–765, 851–853, 840, 700, 740
See application file for complete search history.

(56) References Cited

U.S. PATENT DOCUMENTS

| | | | |
|---|---|---|---|
| 2003/0145018 A1* | 7/2003 | Hitchcock et al. | 707/104.1 |
| 2005/0140497 A1* | 6/2005 | Chiviendacz et al. | 340/5.67 |
| 2006/0056626 A1* | 3/2006 | Keohane et al. | 380/206 |

* cited by examiner

*Primary Examiner* — Cao (Kevin) Nguyen
(74) *Attorney, Agent, or Firm* — Van Pelt, Yi & James LLP

(57) ABSTRACT

Techniques for collecting data via a display page are disclosed. A data entry field that does not display a current value associated with the data entry field is provided in the display page. A display field configured to display at least a portion of the current value associated with the data entry field is included in the display page selectively, e.g., at a time when a display criteria is satisfied.

19 Claims, 3 Drawing Sheets

FORM-FIELD MASK FOR SENSITIVE DATA

BACKGROUND OF THE INVENTION

Web-based forms are used to collect information from users, such as payment information—e.g., credit card number and expiration date—required by an electronic commerce site to complete a transaction. To protect the confidentiality of such information, especially for the benefit of users who may be entering data in a public place and/or using a computer that may be used by others after the user is finished, a password or similar field has been used to collect confidential information. When a password field is used, however, typically the value being entered is not displayed, which may result in data entry errors not being detected by the user prior to submitting the form for processing. For example, a user may not realize that the user has made an error in entering and/or modifying a credit card number that is sixteen digits in length if the number is not displayed while it is being entered and/or edited. One alternative approach is to use a text field for entry of such data and then forcing the page to be refreshed if returned to after a loss of page focus (e.g., another page viewed and/or another application or other window outside the browser selected). Using this approach, the protected value is displayed so long as the user remains on the same page, but a subsequent (or the same) user cannot view the protected value merely by navigating back to the page; instead, such a subsequent viewer sees the page as refreshed, with the previously-entered protected value omitted. However, the latter approach may fail to prevent disclosure of the protected value if the browser software, due to error or otherwise, fails to force a refresh of the page.

BRIEF DESCRIPTION OF THE DRAWINGS

Various embodiments of the invention are disclosed in the following detailed description and the accompanying drawings.

DETAILED DESCRIPTION

Figure 1A:
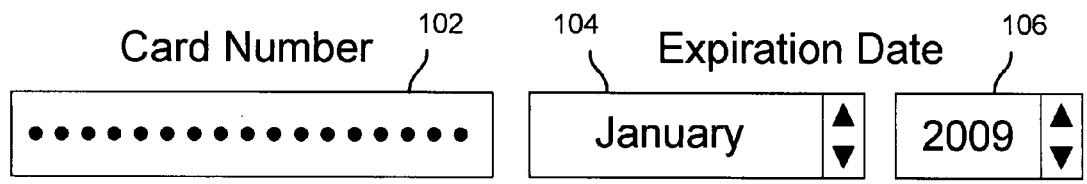
FIG. 1A is illustrates an embodiment of a protected field and associated elements in a state in which a protected value associated with the protected field is hidden.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using a form field mask to prevent undesired disclosure of a protected data is disclosed. In some embodiments, the protected data is entered into a data entry field, such as a password field, that does not itself display a current value of the entry field. At least while the entry field is selected, a current value of the entry field is displayed in a display field that is separate from the entry field. In some embodiments the display field is displayed adjacent to, e.g., immediately below, the entry field. In response to an event, such as a loss of focus on the entry field (e.g., cursors has been moved to another page element), expiration of a timer without receiving further edits to the entry field, etc., the display field is no longer displayed. In some embodiments, the display field is displayed once again if the entry field is selected within a prescribed and in some embodiments configurable period of time and/or the page has not lost focus, e.g., by virtue of the browser having been used to navigate to another page and/or a window not associated with the browser having been selected. In some embodiments, if a protected field such as the entry field is selected after a loss of page or browser focus and/or after expiration of an associated timer, the protected/ entry field is reset and the user is required to re-enter the protected value, if desired.

FIG. 1A is illustrates an embodiment of a protected field and associated elements in a state in which a protected value associated with the protected field is hidden. In the example shown, a protected field 102, in this example configured to receive a credit card number, comprises a password or similar field that does not display its current value. Instead, in this example a series of large dots, each representing a previously-entered digit, are displayed. An expiration month selection field 104 and expiration year selection field 106 are displayed, along with controls usable to select the desired month or year value, as applicable. In some embodiments, the elements as shown in FIG. 1A are displayed whenever a page element other than the protected field 102 is selected. In various embodiments, the protected field 102 is reset, and the value required to be re-entered, if desired, upon a loss of page focus (e.g., browser used to navigate to another page); expiration of a timer after de-selection of an element other than the protected element; and/or loss of browser focus (e.g., window other than one associated with the browser and/or a particular instance, tab, etc. of the browser selected).

Figure 1B:
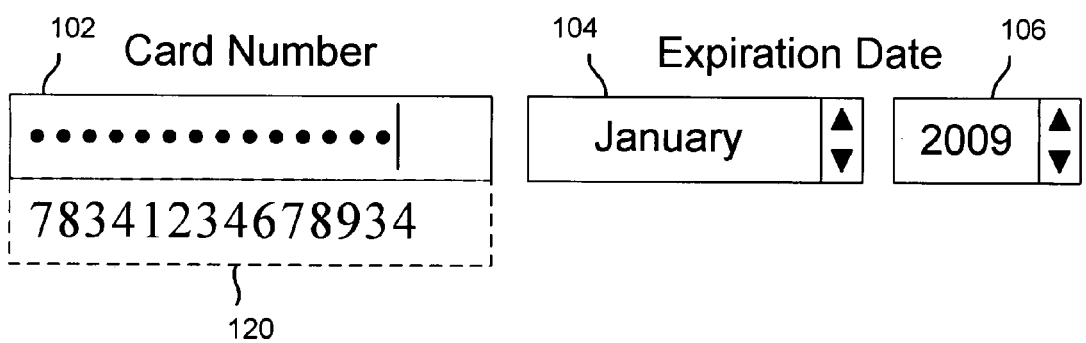
FIG. 1B is illustrates an embodiment of a protected field and associated elements in a state in which a protected value associated with the protected field is displayed.

FIG. 1B is illustrates an embodiment of a protected field and associated elements in a state in which a protected value associated with the protected field is displayed. In the example shown, the protected field 102 is in a selected state, indicated in this example by the presence of a cursor in the field 102, represented in FIG. 1B by the vertical line to the right of the series of large dots. In this example the positioning of the cursor in the protected field 102 indicates the protected field 102 is currently being edited. A current protected value associated with protected field 102 is displayed in a display field 120. In some embodiments, only a portion of the current protected value is displayed, e.g., the last for digits, and other portions are obfuscated, e.g., by displaying an obfuscation character such as a large dot or a letter "x" in a character position corresponding to an obfuscated digit of the protected value. In some embodiments, the display field 120 comprises a "div" or other subdivision of the displayed page that is toggled between a first state in which it is displayed and a second state in which it is hidden (i.e., not included in the page as displayed). For example a JavaScript or other script associated with the protected field 102 causes the display field 120 to be displayed or hidden, as appropriate, in response to browser events associated with the protected field 102, such as selection of the protect field 102 (e.g., an "onclick", mouseover, or other selection event), selection of a page element other than the protect field, loss of page and/or browser window focus, and/or expiration of one or more applicable timers (e.g., protected field 102 has remained selected by no edits have been made within a prescribed time). In some embodiments, a script associated with (e.g., linked to) protected field 102 monitors data values entered into the protected field 102, for example by registering as a listener for at least certain keyboard events, such as those corresponding to a valid character for a protected value associated with the protected field. Typically a password or other protected field will not display and cannot be made to divulge a current value of the field, such that it is necessary for a script or other code to be configured to monitor data as entered, so that the value to be displayed in the display field 120 is known. In various embodiments, events such as loss of page focus, browser focus, and/or expiration of a prescribed period of time result in a reset of the protected field 102, such that a user must re-enter the corresponding value, if desired. Upon re-entry of a protected value, the protected value as re-entered is displayed in the display field 120.

Figure 2:
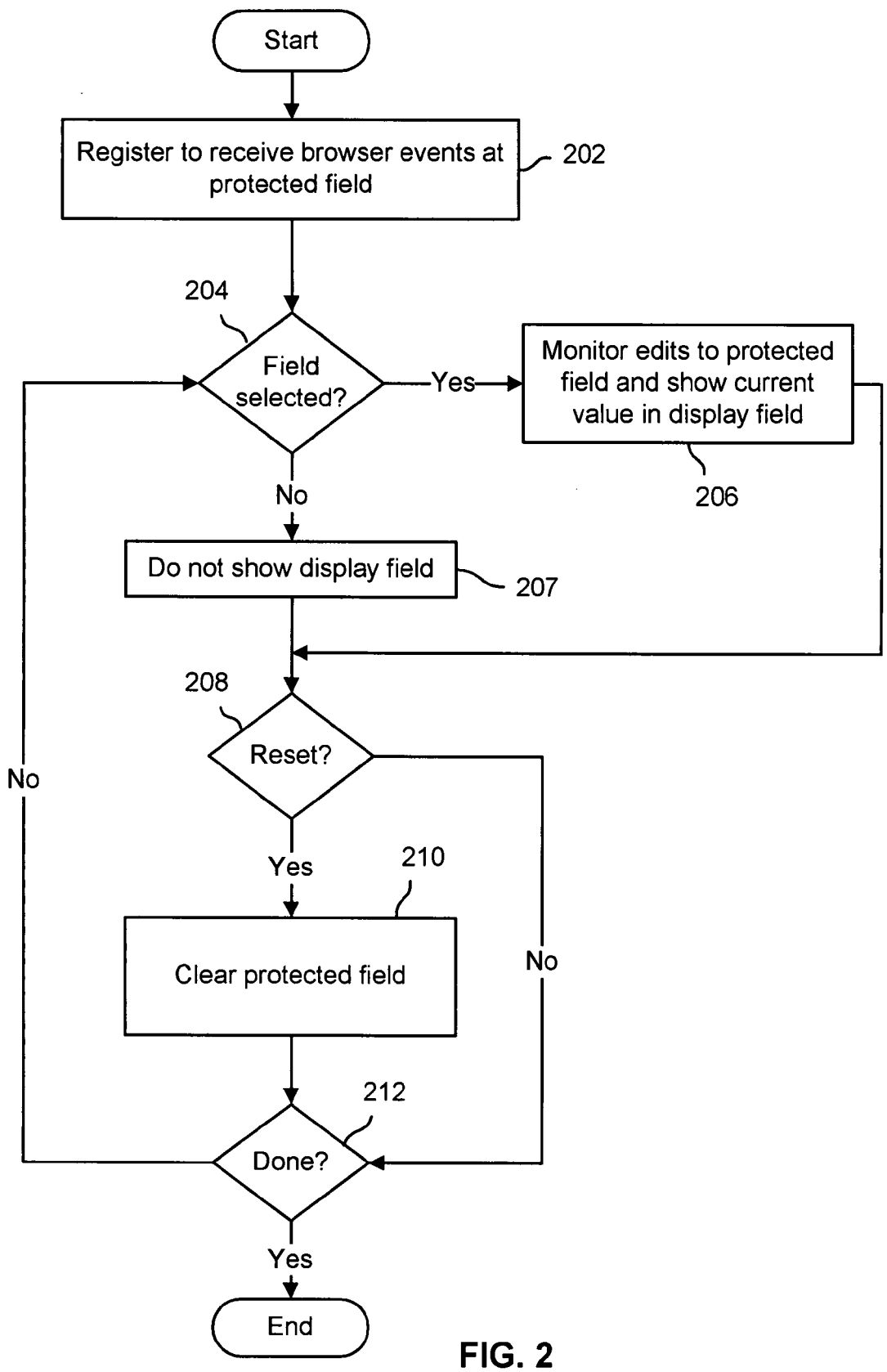
FIG. 2 is a flow chart illustrating an embodiment of a process for selectively displaying a protected value.

FIG. 2 is a flow chart illustrating an embodiment of a process for selectively displaying a protected value. In various embodiments, the process of FIG. 2 is implemented by a script or other code associated with a display page with which the protected value is associated. In the example shown, a registration is made to receive notification of browser events associated with a protected field with which the protected value is associated, e.g., an entry field with which the protected value is associated (202). Examples of such browser events include selection events (e.g., onclick) and keyboard events associated with entry and/or editing of the protected value. If the protected field is in a selected state (204), edits to the field are monitored and a current value associated with the protected field is displayed (206), for example in a conditionally-included "div" or other page element. If the field is not currently selected (204), the current value associated with the protected field is not displayed (207), i.e., remains or is placed in a hidden state. In some embodiments, if the protected field is de-selected after a period of being selected with the current value displayed, the current value remains displayed for a prescribed (and in some embodiments configurable) period after the protected field is no longer selected. In other embodiments, de-selection of the protected field (204) results in the display field being hidden immediately. In some embodiments, the display field is displayed again if the protected field is re-selected, for example within a prescribed time after having been de-selected, unless there has been a loss of page and/or browser focus, or some other reset condition is satisfied, as described more fully below. If it is determined that a reset condition is satisfied (208), the protected field is reset/cleared (210). Examples of a reset condition include expiration of a reset/clear timer, loss of page focus (i.e., navigating to another page), and loss of browser focus (i.e., selection of a window not associated with a browser instance with which the page is associated). If no reset condition is satisfied (208), the protected field is not reset unless or until a reset condition is satisfied. Processing continues no longer required (212), e.g., because the page expires and/or the browser is closed.

Figure 3:
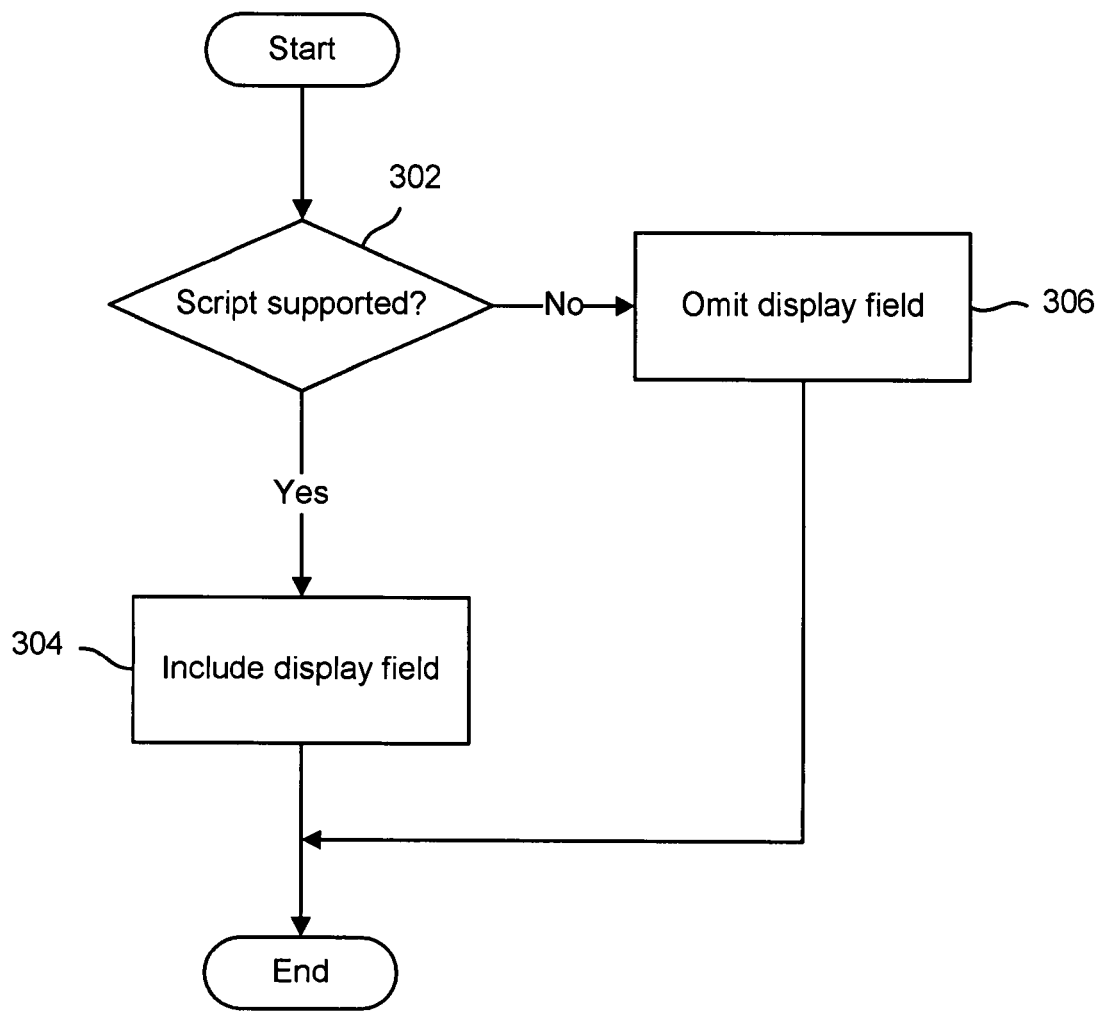
FIG. 3 is a flow chart illustrating an embodiment of a process for conditionally including a display field in which a current value associated with a protected field is displayed.

FIG. 3 is a flow chart illustrating an embodiment of a process for conditionally including a display field in which a current value associated with a protected field is displayed. In the example shown, if the browser being used to render the page supports the script, e.g., JavaScript, required to conditionally include a <div> or other display field or element as described herein (302), the display field is included in the page (304), e.g., by downloading and running a script configured to implement the process of FIG. 2. Otherwise, the display field and associated functionality are omitted (306). In some embodiments, omission of the display field and associated functionality results in a password or similar field being used for the protected field, with the consequence that the value that has been and/or is being entered is not displayed to the user.

Conditionally including a display field, such as a conditionally included <div> or other HTML element, in a page to display at prescribed times and/or under prescribed conditions only a current value of a protected field, coupled with a forced reset or clearing of the protected field if a reset condition is satisfied, enables sensitive and/or otherwise confidential information to be protected without relying on the browser software to force a refresh of the page once a user has navigated to another page or taken other action that suggests the user is done interacting with the page and possibly the (potentially public) computer the user used to interact with the page.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of collecting a data via a display page, comprising:
    providing in the display page a data entry field that does not display a current value entered by a user into the data entry field;
    including in the display page temporarily at a time when a display criteria is satisfied a separate display field separate from the data entry field and configured to display at least a portion of the current value entered by the user into the data entry field;
    wherein the data entry field and the display field is included on the display page simultaneously; and
    wherein if only a portion of the current value is displayed, each digit of an obscured portion of the current value that is not displayed is represented by an obfuscation character.

2. A method as recited in claim 1, wherein the display page comprises a web page.

3. A method as recited in claim 1, wherein the display page comprises a form.

4. A method as recited in claim 1, wherein the data entry field is configured to obscure the current value.

5. A method as recited in claim 1, wherein the data entry field comprises a password field.

6. A method as recited in claim 1, further comprising monitoring the data entry field to keep track of the current value.

7. A method as recited in claim 6, wherein monitoring the data entry field comprises registering to receive notification of a browser event associated with the data entry field.

8. A method as recited in claim 1, wherein the display field is included only if a browser being used to render the display page supports a script configured include the display field.

9. A method as recited in claim 1, wherein the display field comprises an HTML <div> element and further comprising providing a script configured to include the HTML <div> element in the display page if the display criteria is satisfied.

10. A method as recited in claim 1, wherein the display criteria comprises one or more of the following: the data entry field is in a selected state; the data entry field has been modified within a prescribed period of time; the data entry field has been in a selected state within a prescribed period of time; the display page has not lost page focus; and a browser instance with which the display page is associated has not lost focus.

11. A method as recited in claim 1, further comprising resetting the data entry field, such that the data entry field has no current value, in the event a reset condition is satisfied.

12. A method as recited in claim 11, wherein the reset condition comprises one or more of the following: expiration of a reset time; elapse of a prescribed period of time since the data entry field was last in a selected state; loss of page focus; and loss of focus by a browser instance with which the display page.

13. A method as recited in claim 1, wherein the display field is displayed adjacent to the data entry field.

14. A method as recited in claim 1, wherein the entire current value is displayed.

15. A computer program product for collecting a data via a display page, the computer program product being embodied in a computer readable medium and comprising computer instructions for:
   providing in the display page a data entry field that does not display a current value entered by a user into the data entry field;
   including in the display page temporarily at a time when a display criteria is satisfied a separate display field separate from the data entry field and configured to display at least a portion of the current value entered by the user into the data entry field;
   wherein the data entry field and the display field is included on the display page simultaneously; and
   wherein if only a portion of the current value is displayed, each digit of an obscured portion of the current value that is not displayed is represented by an obfuscation character.

16. A computer program product as recited in claim 15, wherein said computer instructions for providing in the display page a data entry field that does not display a current value associated with the data entry field comprising a script associated with the display page.

17. A computer program product as recited in claim 16, wherein said display field comprises an HTML <div> or other display page element and said script is configured to cause said element to be included in the display page only if said display criteria is satisfied.

18. A computer program product as recited in claim 15, further comprising computer instructions for monitoring the data entry field to keep track of the current value.

19. A computer system, comprising:
   a display configured to display a display page; and
   a processor coupled to the display and configured to:
   provide in the display page a data entry field that does not display a current value entered by a user into the data entry field;
   include in the display page temporarily at a time when a display criteria is satisfied a separate display field separate from the data entry field and configured to display at least a portion of the current value entered by the user into the data entry field;
   wherein the data entry field and the display field is included on the display pare simultaneously; and
   wherein if only a portion of the current value is displayed, each digit of an obscured portion of the current value that is not displayed is represented by an obfuscation character.

* * * * *

UNITED STATES PATENT AND TRADEMARK OFFICE
CERTIFICATE OF CORRECTION

| | | |
|---|---|---|
| PATENT NO. | : 7,937,666 B2 | |
| APPLICATION NO. | : 11/825042 | |
| DATED | : May 3, 2011 | |
| INVENTOR(S) | : Ryan R. Klems et al. | |

It is certified that error appears in the above-identified patent and that said Letters Patent is hereby corrected as shown below:

In column 3, line 4, delete "for" and insert -- four --, therefor.

In column 5, line 6, in claim 8, after "configured" insert -- to --.

In column 6, line 35, in claim 19, delete "pare" and insert -- page --, therefor.

Signed and Sealed this
Sixth Day of December, 2011

David J. Kappos
*Director of the United States Patent and Trademark Office*